INVENTOR.
BURTON S. AIKMAN
BY
Wm. M. Cady
ATTORNEY.

Dec. 26, 1939.                B. S. AIKMAN                 2,184,541
                    MOTOR MOUNTING AND BELT TIGHTENER
                       Filed March 4, 1937          3 Sheets-Sheet 3

INVENTOR.
BURTON S. AIKMAN
BY Wm. M. Cady
ATTORNEY.

Patented Dec. 26, 1939

2,184,541

UNITED STATES PATENT OFFICE 2,184,541

MOTOR MOUNTING AND BELT TIGHTENER

Burton S. Aikman, Wilkinsburg, Pa., assignor to The Westinghouse Air Brake Company, Wilmerding, Pa., a corporation of Pennsylvania Application March 4, 1937, Serial No. 128,994

8 Claims. (Cl. 248—23)

This invention relates to motors adapted to drive a machine through a belt and more particularly to the motor mounting and the means for tightening the driving belt of the motor.

Where electric motors are employed for driving air compressors, pumps and the like, it is necessary that the motor be in proper working alignment with the machine to be operated. Usually the motor and machine to be operated are mounted on a common base plate or member to facilitate such alignment and to provide an efficient compact assembly.

It is often desirable to employ the same mounting or base plate for different makes and sizes of motors. For instance if a motor should fail in service it is desirable to be able to readily replace the motor, even with a different make or size. Further, in case the same base plate is used for different sizes of machines, it is desirable to be able to readily mount the proper size motor thereon for operating the machine.

It is well known that the spacing of the bolt holes in the base or feet of electric motors varies with the size and make of motors, so that it is often difficult to mount a motor on a base plate and to obtain a proper alignment between it and the machine to be operated.

The principal object of my invention is to provide an improved motor mounting and belt tightener which is readily adjustable to a large range of different bolt hole spacings encountered in various sizes and makes of motors, so that various motors can be readily mounted thereon, and which is readily adjustable transversely of and in the direction of drive of the motor for aligning the motor in driving relation with the machine to be operated, and for properly adjusting the tension of the driving belt.

Other objects and advantages will be apparent from the following more detailed description of the invention.

Figure 1:
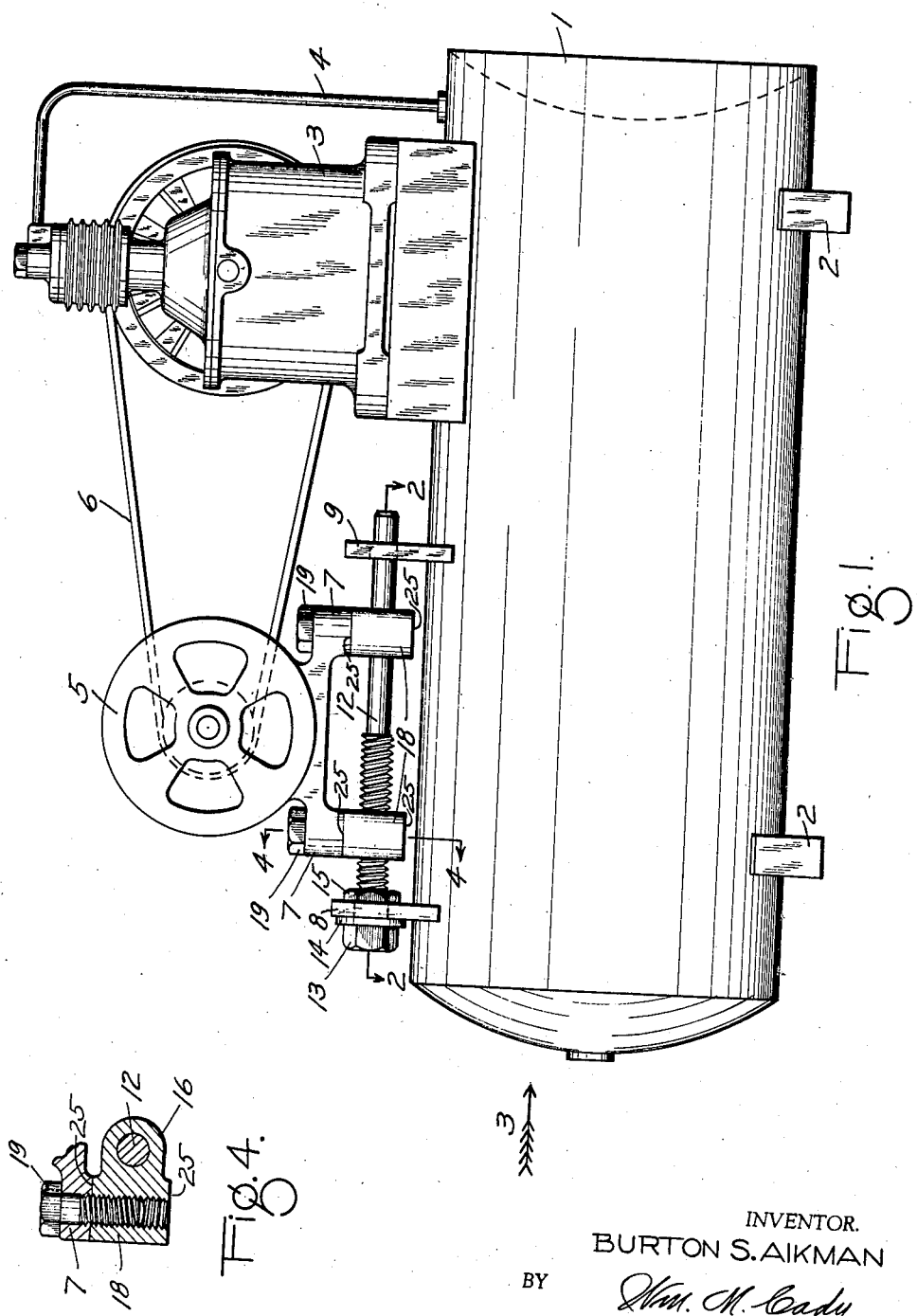
Figure 2:
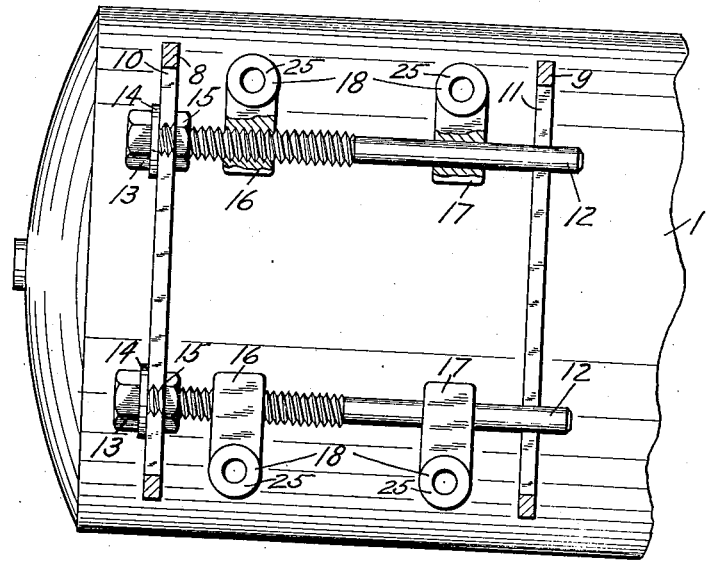
Figure 5:
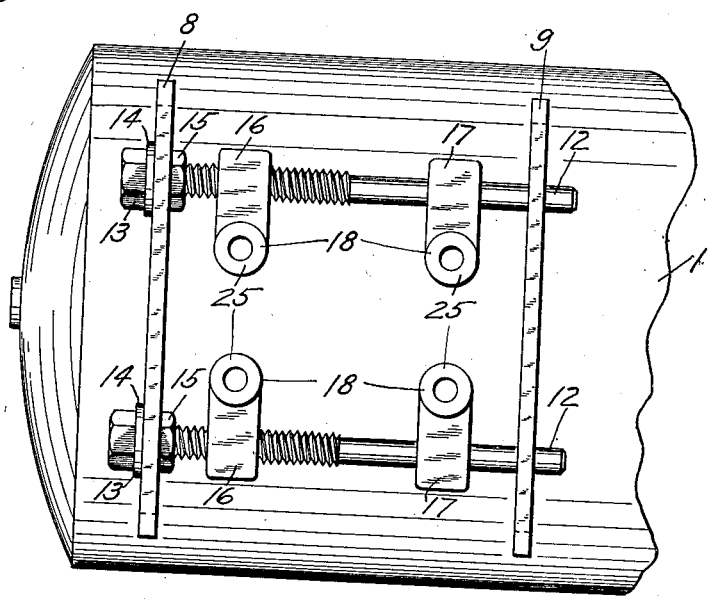
Figure 6:
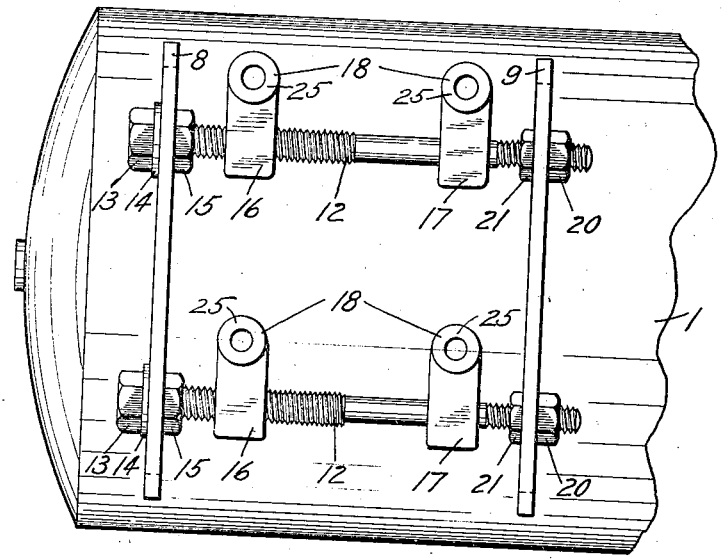
Figure 3:
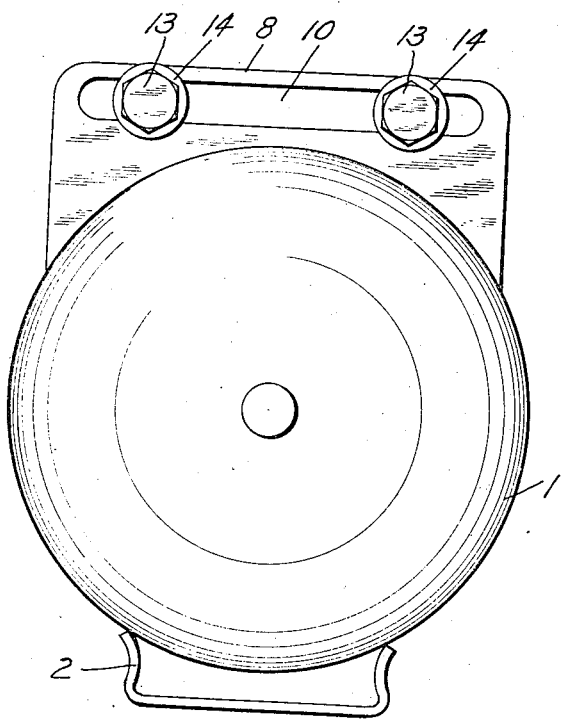

In the accompanying drawings, Fig. 1 is a side elevational view of a motor installation embodying the invention; Fig. 2 is a view, mainly in section, taken on the line 2—2 in Fig. 1; Fig. 3 is an end view taken in the direction of the arrow 3 in Fig. 1; Fig. 4 is a sectional view taken on the line 4—4 in Fig. 1; Fig. 5 is a view similar to Fig. 2 showing certain parts of the motor mounting in a different position; and Fig. 6 is a view similar to Fig. 2 showing certain parts of the motor mounting in still another position and also embodying a modification of the invention.

As shown in the drawings, the improved motor mounting and belt tightener is preferably associated with the electric motor of a motor driven air compressor outfit which, for the purpose of illustration, may comprise a storage reservoir or tank 1 carried by any suitable supports 2 and upon which there is mounted an air compressor 3 adapted to compress air through a discharge pipe 4 into the tank 1, and an electric motor 5 connected to and adapted to operate said compressor through the medium of a belt 6. The motor 5 may be of any conventional type having mounting flanges or feet 7 adapted to be secured to a mounting carried by the tank 1 and embodying the invention, which will now be described.

The tank 1 forms the base member or portion of my improved motor mounting which comprises two spaced parallel upright plates or brackets 8 and 9 mounted transversely on the top of said tank and secured thereto in any suitable manner, as by welding. The bracket 8 is provided with an elongated slot 10, and the bracket 9 has a similar, aligned slot 11. Two adjusting rods 12 are provided with one end of each extending through the slot 10 and the other end of each extending through the slot 11. Each of these rods has a head 13 and is provided with screw threads which extend from the head for about one half the length of the rods, the remainder of the length of said rods not being threaded. A washer 14 is interposed between the head 13 on each of the rods 12 and the bracket 8 and a lock nut 15 is provided on each of the rods on the opposite side of the bracket 8 and is adapted to be screwed into engagement with said bracket for locking said rods in an adjusted position in the brackets 8 and 9.

Two motor mounting lugs 16 and 17 are rotatably mounted on each of the rods 12, the lugs 16 being disposed on the screw-threaded portion of said rods and having screw-threaded engagement therewith, while the lugs 17 are slidably mounted on the unthreaded portion of said rods.

Each of the motor mounting lugs 16 and 17 is provided with an offset portion 18, having oppositely disposed parallel mounting faces or sides 25 arranged parallel to the axis of the rods. A screw-threaded bore spaced from the respective rod 12, and arranged at right angles to the axis of said rod is provided through each of the offset portions 18 and faces 25. The mounting flanges or feet 7 of the electric motor are adapted to be secured by cap screws 19, in the manner shown in Figs. 1 and 4 of the drawings, to either one or the other of the faces 25 on the offset portion 18 of the mounting lugs 16 and 17, depending upon which side of the rods 12 the offset portions 18 of said lugs are disposed.

In use, when it is desired to mount a selected motor on the mounting lugs 16 and 17, the lock nuts 15 are first backed off to release the rods 12 from the bracket 8 so that said rods may be moved in the slots 10 and 11.

The offset portion 18 of each of the motor mounting lugs 16 is then turned to one side of the respective rod, for instance to the positions shown in Fig. 2 of the drawings. Then, if necessary, the rods 12 are shifted in the slots 10 and 11 until the bolt holes in the offset portions 18 are spaced apart a distance corresponding roughly to the longitudinal spacing of the bolt holes in the feet 7 at one side of the motor. The motor is then mounted on the uppermost faces 25 of the lugs 16 and the cap screws 19 are inserted through the motor feet 7 and screwed into the offset portions of said lugs.

Since the mounting lugs 17 move with the rods 12 upon adjusting the lugs 16 to the motor feet 7, it is merely necessary after such adjustment, to turn the offset portion 18 of the lugs 17 to point in the same direction as the corresponding portion of the lugs 16, and then slide the lugs 17 on the unthreaded portion of said rods until the screw-threaded bores in the offset portions of said lugs 17 align with the bolt holes in the motor feet at that side of the motor, and then the cap screws 19 are inserted through said motor feet and screwed into the lugs 17. All of the cap screws 19 are then tightened so that the motor is rigidly secured to the lugs 16 and 17.

Since the lock nuts 15 have not yet been screwed down, the rods 12 are free to move in the slots 10 and 11, so that the motor assembly including the rods 12 may then be adjusted transversely of the tank 1 to secure proper working alignment with the compressor 3.

After the motor 5 is aligned with the compressor, the belt 6 is applied to said motor and compressor. Then by means of a wrench applied to the head 13 of rods 12, said rods are turned to pull the mounting lugs 16 and 17 and thereby the motor 5 in a direction away from the compressor until the proper tension is obtained in the belt 6, after which the lock nuts 15 are screwed up against the bracket 8 to hold the rods 12 in their adjusted position and thereby the motor 5 in working alignment with the compressor 3 with the proper tension applied to belt 6.

It will be noted that in adjusting the belt 6, the turning of rods 12 directly effects movement only of the lugs 16 due to the screw-threaded connection between said lugs and rods, and that the mounting lugs 17 which are secured to the motor merely slide on the unthreaded portion of said rods during such adjustment.

If the bolt hole spacing in the feet 7 of the selected motor is such that the motor can not be readily mounted on the lugs 16 and 17 when the offset portions thereof point in the direction shown in Fig. 2 of the drawings, or if in order to mount the motor it should be necessary to move the rods 12 too close together to provide a sufficiently rigid mounting or if for any other reason such a mounting could not be effected or would be undesirable, said lugs may be turned on said rods to provide various combinations of positions of the offset portions 18 to suit the selected motor. For instance, the lugs 16 and 17 may be turned so that the offset portions of all of the lugs point inwardly as shown in Fig. 5 of the drawings, or so that the offset portions of the lugs on one rod 12 point in the same direction as those on the other rod as shown in Fig. 6 of the drawings, or, if necessary the lugs may be adjusted so that said offset portions are reversed from the positions shown in Fig. 6. Due to this reversibility of the lugs 16 and 17 and the slidable mounting of the rods 12 in the brackets 8 and 9, the offset portions of said lugs are readily adjustable to the mounting feet of a selected motor, lengthwise thereof, while the slidable mounting of the lugs 17 on the rods 12 provides for ready adjustment to the motor feet transversely of the motor. In other words, this improved motor mounting is readily adjustable to fit and carry a large variety of different sizes and makes of motors and to align the motor carried thereby to the machine to be operated.

In the embodiment of the invention shown in Figs. 1, 2 and 5 of the drawings, the rods 12 are held against shifting in the slots 10 and 11 only at one end, that is, by means of the lock nuts 15. This construction is considered adequate to rigidly hold the motor in working alignment with the compressor 3. However, if desired, the rods 12 may be secured at their other end to the bracket 9 by screw-threading that end of the rod and providing thereon two nuts 20 and 21, one at either side of the bracket 9 for locking engagement therewith, as shown in Fig. 6 of the drawings. In this modified construction it will be evident that the nuts 20 and 21 will have to be backed out of engagement with the bracket 9 when the jam nut 15 is loosened from the bracket 8 in order to permit mounting of the motor on the lugs 16 and 17 and subsequent adjustment of the motor to the machine to be operated, after which the nuts 20 and 21 must be screwed into engagement with the bracket 9 when the jam nut 15 is screwed against the bracket 8.

While two illustrative embodiments of the invention have been described in detail, it is not my intention to limit its scope to those embodiments or otherwise than by the terms of the appended claims.

Having now described my invention, what I claim as new and desire to secure by Letters Patent, is:

1. A motor mounting comprising a base member, two spaced rods carried by said member, a lug having screw-threaded engagement with each rod, to which lugs the motor base is adapted to be secured whereby the lugs and the motor base may be shifted longitudinally upon rotation of said rods, said rods being movable transversely in said base member to a position for adjustment, and means for securing said rods to said base member in the position of adjustment.

2. A motor mounting comprising a base member, a pair of spaced rods carried by said base member, a lug on each rod having screw-threaded engagement with the rod, a lug on each rod having sliding engagement therewith, the lugs being adapted to have the motor base secured thereto, whereby the rotation of the rods adjust the longitudinal position of the motor.

3. A motor mounting comprising a base member, two spaced brackets carried by said base member each having a slot aligned with a like slot in the other, two rods disposed with one end slidably mounted in one of said slots and the other end slidably mounted in the other slot, means on each rod adapted to be secured to the base of the motor for carrying said motor, said rods being movable in said slots relative to said base member and to each other for adjusting said means to the motor base, and means for securing said rods against movement relative to said brackets.

4. A mounting for an electric motor comprising a base member, a pair of rods movable transversely of said base member and relative to each other, elements corresponding in number to the bolt holes in the base of said motor and having offset portions to either of the opposite faces of which said motor base is adapted to be secured for carrying said motor, said elements being mounted on said rods and rotatable thereon so that the offset portions are disposed either between said rods or at the opposite sides of said rods for adjustment to the motor base in one direction, said rods being movable transversely of said base member also for adjustment of said elements to said motor base in the same direction, the elements for carrying one side of said motor base being slidable on said rods for adjustment to that side of the motor base, the other elements having screw-threaded engagement with said rods whereby rotation of said rods is adapted to effect adjustment of all of said elements and said motor relative to said base member in a direction at right angles to the first named direction, and means for securing said rods and thereby said elements against movement relative to said base member.

5. A motor mounting comprising a base member, two spaced rods carried by said member, a lug carried by each rod and having at one side of said rod an offset portion to either of the opposite sides of which the base of a motor is adapted to be secured, said lugs being adapted to be rotated on said rods so that the offset portions are disposed either between said rods or at the opposite sides of the rods for adjustment to the motor base.

6. A motor mounting comprising a base member, two spaced rods carried by said base member and being movable transversely relative to said base member and to each other, a lug on each rod having at one side of the rod an offset portion to either of the opposite sides of which the motor base is adapted to be secured, said lugs being adapted to be applied to the rods so that the offset portions are disposed either between said rods or at the opposite sides of the rods, and means for securing said rods to said base member to prevent movement of said rods.

7. A motor mounting comprising a base member, two spaced rods carried by said base member and being movable transversely relative to said base member and to each other, a lug on each rod having screw-threaded engagement therewith and having at one side of the rod an offset portion to either of the two opposite sides of which the motor base is adapted to be secured, said lugs being adapted to be applied to said rods so that the offset portions are disposed either between said rods or at the opposite sides of the rods and said lugs being movable longitudinally of said rods upon rotation thereof, and means for securing said rods to said base member to prevent movement of said rods.

8. A motor mounting comprising a base member, a pair of spaced rods carried by said base member, a lug on each rod having screw-threaded engagement therewith, a lug slidably mounted on each rod, each of said lugs having at one side of the respective rod an offset portion either of the opposite sides of which is adapted to be secured to the base of the motor, said lugs being adapted to be applied to said rods with the offset portions disposed at either one side or the other of the rods for adjustment to the motor base in one direction thereof, and the lugs slidable on the rods being movable relative to the other lugs for adjustment to the motor base in a direction at right angles to the first named direction, said lugs and thereby the motor being movable longitudinally of said rods upon rotation thereof.

BURTON S. AIKMAN.